United States Patent [19]

Chang

[11] Patent Number: 5,294,468
[45] Date of Patent: Mar. 15, 1994

[54] APPARATUS FOR MAKING FURNITURE

[75] Inventor: Chao-Lee Chang, Chiayi Hsien, Taiwan

[73] Assignee: Taiwan Shin Yeh Enterprise Co., Ltd., Chiayi Hsien, Taiwan

[21] Appl. No.: 819,841

[22] Filed: Jan. 13, 1992

Related U.S. Application Data

[63] Continuation-in-part of Ser. No. 576,217, Aug. 31, 1990, Pat. No. 5,079,053.

[51] Int. Cl.⁵ .................................................. B32B 3/20
[52] U.S. Cl. ................................. 428/35.8; 428/36.9; 428/188; 138/115
[58] Field of Search ................... 428/188, 35.8, 36.9; 138/115, 111

[56] References Cited

U.S. PATENT DOCUMENTS 3,965,942   6/1976   Hatch .................................. 139/384
3,966,013   6/1976   Hatch et al. ...................... 181/33 G

*Primary Examiner*—Ellis P. Robinson
*Assistant Examiner*—Charles R. Nold
*Attorney, Agent, or Firm*—Harness, Dickey & Pierce

[57] ABSTRACT

An apparatus includes an elongated flexible tube with an oblong cross section. The tube has two opposed long sides and an elongated partition wall extends parallel with the opposed long sides. The elongated partition wall defines a slot within the same, into which an iron pipe of elliptical shape in cross section is inserted.

1 Claim, 3 Drawing Sheets

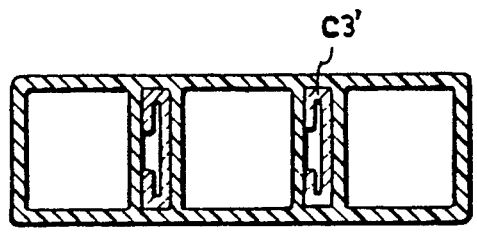
F I G. 5
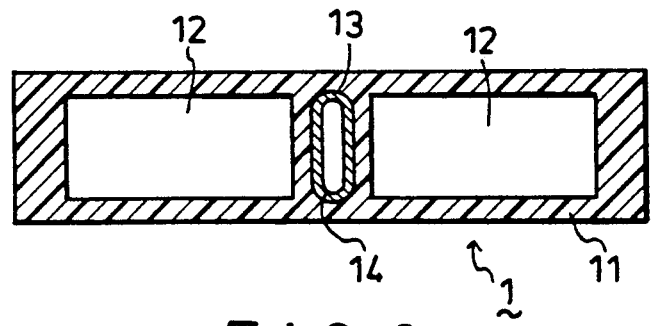
F I G. 6

APPARATUS FOR MAKING FURNITURE

CROSS-REFERENCE OF RELATED APPLICATION

This invention is a Continuation-in-Part application of U.S. patent application Ser. No. 576,217, filed on Aug. 31, 1990 and now U.S. Pat. No. 5,079,053.

BACKGROUND OF THE INVENTION

Field of Invention

This invention relates to an apparatus, more particularly to a flexible apparatus having an oblong cross section which can be used to construct more durable and lasting furniture.

Description of the Related Art

Most present day furniture is made of metal in combination with plastic material, an abundant product from the oil industry. One of such apparatuses from which the furniture is made is shown in FIG. 1. Said apparatus (A) has an oblong cross section including a plurality of partition walls (a1) to define a plurality of channels (a2). A metal pipe (a3) is disposed in the central channel to make said apparatus more rigid. The chair (20) in FIG. 2 is made from such an apparatus. During the furniture making process, said tube has to be folded, cut, bent or straightened. Though the tube which itself is flexible, does not lose its compressive strength, the metal pipe (a3) disposed within is weakened. The finished product is therefore not as durable as it could be.

There is still another kind of structural tube (B) used to make furniture, as shown in FIG. 3, which is made solely from plastic material. Its construction is a bit complicated and the manufacturing cost is high. Though this type of tube is easy to cut, bend, saw or straighten, it lacks compressive strength and does not last long.

Recently, a more useful furniture making tube has been invented as shown in FIG. 3, which has an oblong cross section. Said tube is also made from plastic material and has two opposed long sides (C). A plurality of elongated partition walls extend between the two opposed long sides (C), defining a plurality of channels (C1), and each of the elongated partition walls defines a slot (C2) within the same. A metal plate (C3) which has sufficient thickness is inserted into the slot (C2) to strengthen the tube.

In order to economize the metal plate, one can bend the metal plate (C3') inserted in the slot to form a substantially C shape, if the slot is a bit large as shown in FIG. 4. Such a kind of tube has more compressive strength than the former ones so that furniture made from this tube is accordingly more durable.

It has been found that the above-mentioned tube is not so strong and durable as it normally should be, therefore it does not fully satisfy everyones' needs. Therefore, an apparatus is badly needed to satisfy everyones' needs.

SUMMARY OF THE INVENTION

An object of the present invention is to provide a furniture making apparatus which possesses more compressive strength than the previous model ones.

Another object of the present invention is to provide a furniture making apparatus which is easy to produce and which costs less to produce than that of the prior art ones.

According to the present invention, a flexible tube member which is made from plastic material includes two opposed walls in which an elongated partition wall extends parallel to the two opposed walls. The elongated partition wall has a slot within the same into which an iron pipe is inserted to strengthen the flexible tube member for making furniture.

BRIEF DESCRIPTION OF THE DRAWING

Other features and advantages of the present invention will become more apparent in the following detailed description, including drawings, all of which show a non-limiting form of the present invention, and of which:

FIGS. 4 and 5 respectively show an improved form of an apparatus for making furniture according to the U.S. Pat. No. 5,079,053.

FIG. 6 shows a furniture making apparatus according to the present invention.

DETAILED DESCRIPTION OF THE PREFERRED EMBODIMENT

Figure 1:
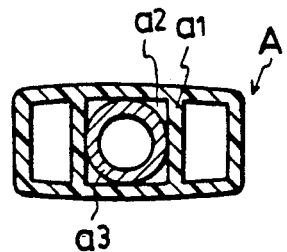
FIG. 1 shows an apparatus of the prior art from which furniture is made.
Figure 2:
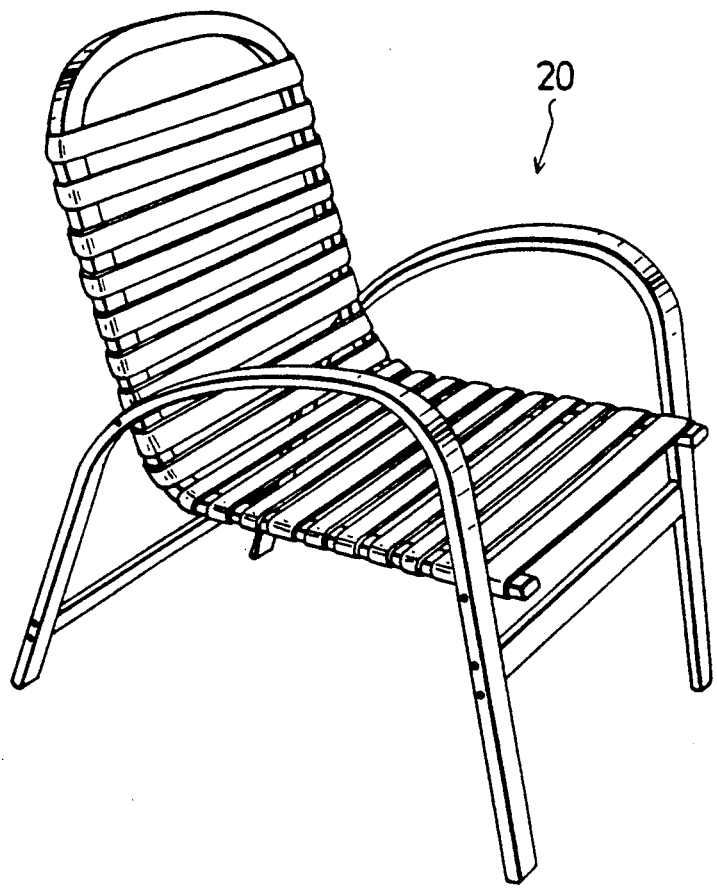
FIG. 2 shows a chair made from the apparatus of FIG. 1.
Figure 3:
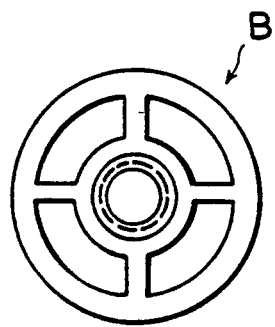
FIG. 3 shows another form of apparatus of the prior art from which a furniture is made.
Figure 4:
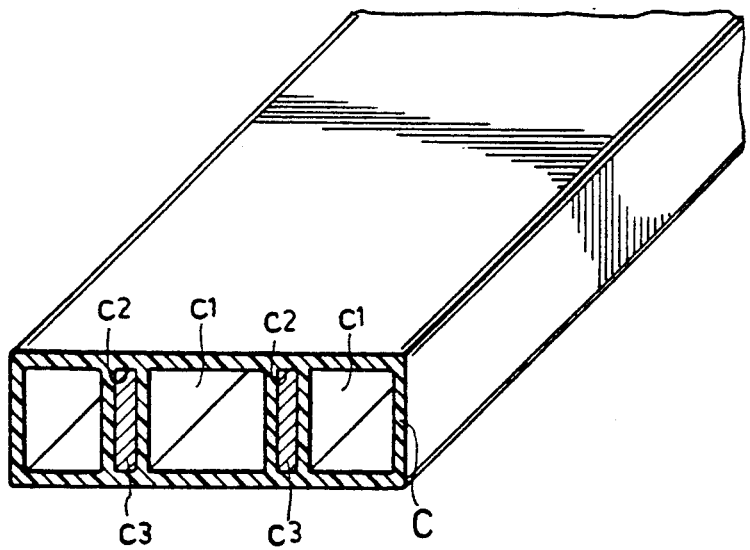

The present invention is meant to improve the compressive strength of the furniture making apparatus of U.S. Pat. No. 5,079,053.

According to said U.S. Patent and referring to FIG. 6, the furniture making apparatus is a flexible tube member (1), made of plastic material which has an oblong cross section with two opposed long walls (11). An elongated partition wall extends parallel with the two opposed walls (11), dividing the flexible tube member (1) into a plurality of channels (12). The partition wall itself defines a slot (13) within the same into which an iron pipe (14) of substantially oval-shaped cross section is inserted so as to strengthen the flexible tube member while making furniture. Furniture made of the present furniture making apparatus can provide better compressive strength than the prior art. The assertion is supported by an experiment, the result of which is as follows:

|   |   | A: prior art tube | B: U.S. Pat. No. 5,079,053 Tube | C: present tube |
|---|---|---|---|---|
| 1. | Thickness of plastic mat: | 2.3 mm | 2.3 mm | 2.3 mm |
|   | length: |   | 70 mm | 70 mm |
|   | width: |   | 23 mm | 23 mm |
| 2. | Type of metal (outer dia: inner dia: (flexible tube length: width: | steel 16.5 mm 14.0 mm 79 mm 21 mm) | iron | iron |
|   | (Thickness of iron width: |   | 16 mm | 16 mm) |
|   | thickness: |   | 1.4 mm | 1.4 mm) |
| 3. | Dist. bet. two iron plates | 30 |   |   |
| 4. | compressive strength | 94 kg | 118.5 kg | 136 kg |

As indicated above, the apparatus made according to the present invention has more compressive strength than the prior art apparatus. Therefore, furniture made of such tubing is more durable and longer lasting than that made from prior art tubing.

While the invention has been described in connection with what is considered to be the most practical and preferred embodiment, the invention is not to be limited to the disclosure only, but on the contrary it is intended to cover various modifications and equivalent arrangements within the broadest interpretation of the present invention so as to encompass all such modifications and equivalent arrangements.

I claim:

1. An apparatus for making furniture comprising:
   an elongated flexible tube member having an oblong rectangular shape in cross section, said tube member being made from a plastic material;
   said elongated tube member having two opposed long sides and at least one elongated partition wall extending between said two opposed long sides;
   said partition wall having a slot therein; and
   a metal plate which has a wall thickness smaller than the thickness of said slot and adapted to fit into said slot, being inserted into said slot to strengthen said elongate flexible tube member;
   characterized in that said metal plate is an elongated hollow plate having a substantially elliptical shape in cross section.

* * * * *